(12) United States Patent
Sato

(10) Patent No.: US 8,279,537 B2
(45) Date of Patent: Oct. 2, 2012

(54) IMAGING LENS, CAMERA MODULE, AND IMAGING APPARATUS

(75) Inventor: Setsu Sato, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 30 days.

(21) Appl. No.: 12/983,444

(22) Filed: Jan. 3, 2011

(65) Prior Publication Data

US 2011/0164327 A1 Jul. 7, 2011

(30) Foreign Application Priority Data

Jan. 6, 2010 (JP) ................................. 2010-001507

(51) Int. Cl.
*G02B 9/60* (2006.01)
(52) U.S. Cl. ......... 359/764; 359/763; 359/714; 359/740

(58) Field of Classification Search .................. 359/714, 359/740, 763, 764
See application file for complete search history.

(56) References Cited

FOREIGN PATENT DOCUMENTS

JP 58156916 A * 9/1983
JP 2007-298572 A 11/2007

* cited by examiner

*Primary Examiner* — Evelyn A. Lester
(74) *Attorney, Agent, or Firm* — Foley & Lardner LLP

(57) ABSTRACT

An imaging lens includes, sequentially from an object side, a positive first lens; a negative second lens; a positive third lens having a convex surface on an image plane side; a fourth lens that is a meniscus lens having a convex surface on the image plane side; and a fifth lens having a refractive power that gradually changes from negative at the lens center to positive at the lens periphery, where the first lens and the second lens are disposed having an interval therebetween.

9 Claims, 12 Drawing Sheets

IMAGING LENS, CAMERA MODULE, AND IMAGING APPARATUS

BACKGROUND OF THE INVENTION

1. Field of the Invention

The present invention relates to a compact, light-weight, imaging lens suitable for digital imaging apparatuses equipped with a solid-state image sensing device such as a charged coupled device (CCD) and a complementary metal oxide semiconductor (CMOS). The present invention further relates to a camera module equipped with the imaging lens and an imaging apparatus equipped with the camera module.

2. Description of the Related Art

In recent years, portable digital imaging apparatuses such as cellular telephones and digital cameras have become widely prevalent. Accompanying demand for more compact digital imaging apparatuses is demand for the imaging lens equipped on such digital imaging apparatuses to be further reduced in size. To satisfy such demands, compact lenses have been proposed such as that disclosed in Japanese Patent Application Laid-Open Publication No. 2007-298572.

The imaging lens disclosed in Japanese Patent Application Laid-Open Publication No. 2007-298572 includes, sequentially from an object, an aperture stop, a positive first lens, a negative second lens cemented to the first lens, a third lens having a concave surface facing toward the object, a fourth lens having a concave surface facing toward the object, and a fifth lens having a convex surface facing toward the object. By having this configuration, the imaging lens is a compact, bright lens system having a short overall length, is suitable for application to a compact imaging apparatus such as a cellular telephone, and capable of favorable correction of various types of aberration.

Cameras equipped on cellular telephones are now capable of not only capturing still images, but also moving images. Conventional compact imaging lenses such as that disclosed in Japanese Patent Application Laid-Open Publication No. 2007-298572 realize, at most, brightness on the order of F2.8. If a cellular telephone equipped with such an imaging lens is used in a dark place to capture a still image, no particular problem arises since a light-emitting device capable of instantaneously emitting a flash of bright light like that of a strobe is provided. However, if a moving image is to be captured, the light-emitting device must be operated continuously since bright light is continuously required during operation of the camera. Longer operation of the light-emitting device increases power consumption and also rapidly depletes the battery, which is a significant problem particularly with compact imaging apparatuses on cellular telephones having small batteries.

One approach to address the problem of power consumption is to increase the aperture size, whereby images can be captured even in dimly lit places, without use of a flash. However, implementing larger apertures on conventional compact imaging lenses such as that disclosed in Japanese Patent Application Laid-Open Publication No. 2007-298572 makes effective correction of aberration difficult. In particular, with the lens disclosed in Japanese Patent Application Laid-Open Publication No. 2007-298572, since the aperture stop is disposed nearest the object, if the aperture size is increased, the correction of spherical aberration, chromatic difference of magnification, etc. becomes difficult. In addition, it becomes difficult to maintain the compact size of the lens.

SUMMARY OF THE INVENTION

It is an object of the present invention to at least solve the above problems in the conventional technologies. third lens having a convex surface on an image plan side; a An imaging lens according to one aspect of the invention includes, sequentially from an object side, a positive first lens; a negative second lens; a positive third lens having a convex surface on an image plane side; a fourth lens that is a meniscus lens having a convex surface on the image plane side; and a fifth lens having a refractive power that gradually changes from negative at the lens center to positive at the lens periphery, where the first lens and the second lens are disposed having an interval therebetween.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
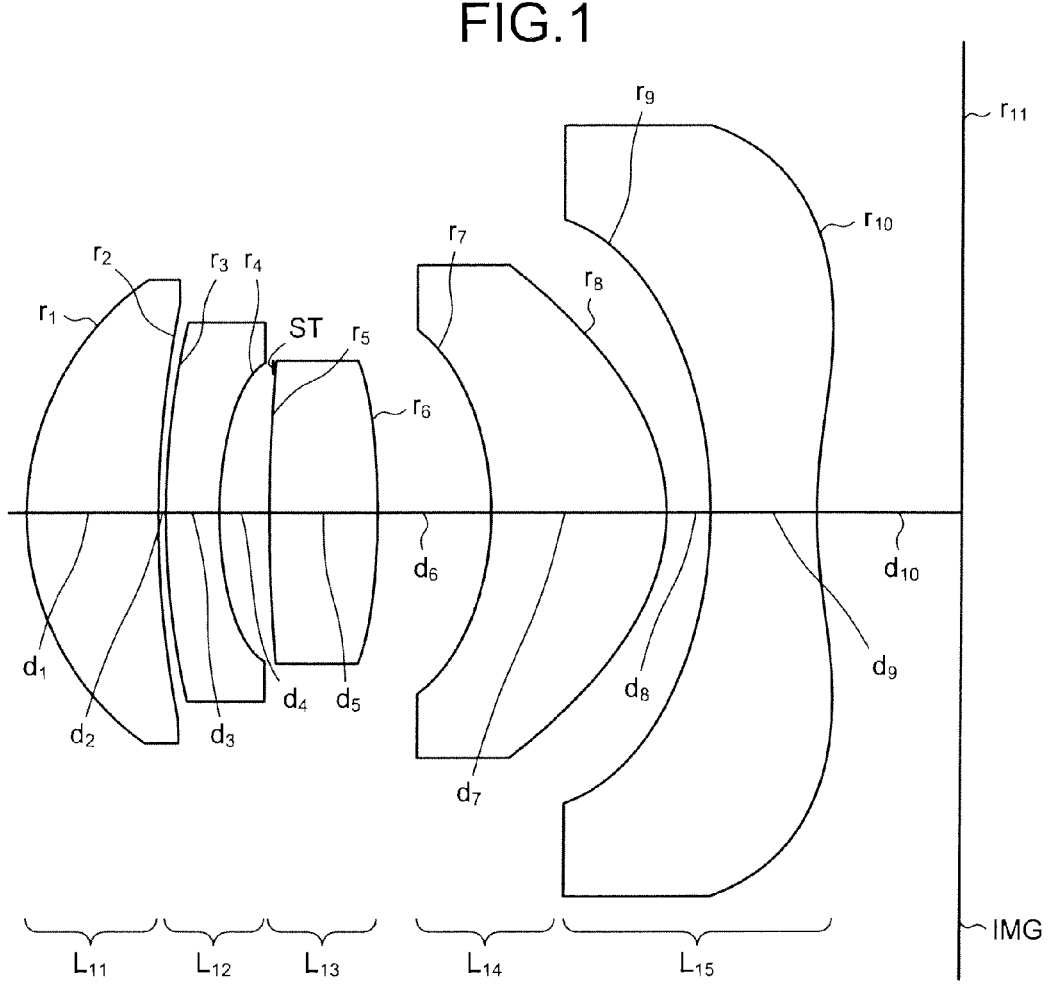
FIG. 1 is a cross sectional view (along the optical axis) of the imaging lens according to a first example.

Referring to the accompanying drawings, exemplary embodiments according to the present invention are explained in detail below.

An imaging lens according to an embodiment includes, sequentially from the object side, a positive first lens, a negative second lens, a positive third lens having a convex surface on the image side, a fourth lens that is a meniscus lens having the convex surface on the image side, and a fifth lens having a refractive power that gradually changes from negative at the lens center to positive at the lens periphery. The imaging lens is a bright lens implemented by the third lens having a convex surface on the image side. Further, since the imaging lens is configured by the fifth lens that has a refractive power that gradually changes from negative at the lens center to positive at the lens periphery, the off-axis chief ray angle can be reduced, whereby the lens is suitable for disposal on a compact imaging apparatus. In addition, by disposing the first lens and the second lens to have an interval therebetween, correcting surfaces increase and a bright lens is implemented, whereby prominent spherical aberration can be favorably corrected.

By forming the third lens to have a biconvex shape, a brighter lens is implemented and extremely favorable spherical aberration correction becomes possible. Further, by forming the first lens and the second lens as meniscus lenses having the convex surface on the object side, various types of aberration including spherical aberration and coma aberration can be corrected even more favorably.

Preferably, in the imaging lens according to the embodiment, an aperture stop is disposed between any of the first to the fifth lenses, whereby well-balanced correction of chromatic difference of magnification, off-axis aberration, and longitudinal chromatic aberration becomes possible. Well-balanced correction of such aberration becomes possible particularly if the aperture stop is disposed between the second and the third lenses.

The imaging lens according to the embodiment preferably satisfies the following conditional expression, where D is the effective diameter of the first lens and f is the focal length of the entire imaging lens system.

$$3.0 \geq f/D \geq 0.7 \quad (1)$$

Conditional expression (1), within a range that spherical aberration can be corrected from a structural standpoint of the imaging lens, prescribes lens brightness (F number) to enable the capturing of a bright image in a dimly lit place, without the use of a flash. Below the lower limit of conditional expression (1), even if a bright image is obtained, the correction of spherical aberration becomes difficult. Above the upper limit of conditional expression (1), a bright image cannot be obtained in a dimly lit place, without the use of a flash.

The imaging lens according to the embodiment preferably satisfies the following conditional expressions, where $\upsilon d1$ is the Abbe number of the first lens, and $\upsilon d2$ is the Abbe number of the second lens.

$$\upsilon d1 > 50 \quad (2)$$

$$\upsilon d2 < 25 \quad (3)$$

Conditional expressions (2) and (3) are conditions for improving chromatic aberration. Satisfaction of conditional expressions (2) and (3) enables extremely favorable correction of chromatic aberration. Below the lower limit of conditional expression (2) and above the upper limit of conditional expression (3), the occurrence of chromatic aberration become prominent and thus, is undesirable.

Forming at least one surface among the first to the third lenses to be aspheric is sufficient. By doing so, various types of aberration including spherical aberration and coma aberration can be corrected even more favorably. Further, by forming any among or all of the lenses (the first to the fifth) of resin, which is light-weight and easy to process, the imaging lens becomes light-weight and can be provided at a lower cost.

The imaging lens according to the embodiment is configured as described and therefore, as described, is compact, light-weight and low cost, has excellent optical performance, and is able to capture bright images in dimly lit places, without the use of a flash. In particular, the imaging lens exhibits excellent results in capturing moving images in dimly lit places.

Further, by equipping the imaging lens having the described characteristics together with an imaging device that outputs an imaging signal according to an optical image formed by the imaging lens, a camera module capable of capturing images in dimly lit places, without the use of a flash, can be provided. Additionally, by configuring an imaging apparatus to include the camera module, an imaging apparatus capable of capturing images in dimly lit places, without the use of a flash, can be implemented.

FIG. 1 is a cross sectional view (along the optical axis) of the imaging lens according to a first example. The imaging lens includes, sequentially from an non-depicted object, a positive first lens $L_{11}$, a negative second lens $L_{12}$, a biconvex third lens $L_{13}$, a fourth lens $L_{14}$ that is a meniscus lens having the convex surface facing toward an image plane IMG, and a fifth lens $L_{15}$ having a refractive power that gradually changes from negative at the lens center to positive at the lens periphery. The first lens $L_{11}$ and the second lens $L_{12}$ are disposed having an interval therebetween. Further, the first lens $L_{11}$ is formed of a glass material and the second lens $L_{12}$ to the fifth lens $L_{15}$ are formed of resin. Each surface of the first lens $L_{11}$ to the fifth lens $L_{15}$ is aspheric. At the surface on the object side of the third lens $L_{13}$, an aperture stop ST of a given diameter is disposed. At the image plane IMG, the optical receiving surface of an imaging device such as a CCD and CMOS is disposed.

Various values related to the imaging lens according to the first example are indicated below.

--- focal length of entire imaging lens system (f) = 6.298738
F number = 1.98
maximum angle of view: 59°
effective diameter of first lens $L_{11}$ (D) = 3.5
(Values related to conditional expression (1))
f/D = 1.7996394
(Values related to conditional expression (2))
Abbe number for first lens $L_{11}$ ($\upsilon d1$) = 57.74
(Values related to conditional expression (3))
Abbe number for second lens $L_{12}$ ($\upsilon d2$) = 23.90

| | | | |
|---|---|---|---|
| $r_1$ = 2.146 (aspheric surface) | $d_1$ = 1.000 | nd1 = 1.610 | $\upsilon d1$ = 57.74 |
| $r_2$ = 8.918 (aspheric surface) | $d_2$ = 0.050 | | |
| $r_3$ = 8.797 (aspheric surface) | $d_3$ = 0.400 | nd2 = 1.634 | $\upsilon d2$ = 23.90 |
| $r_4$ = 2.580 (aspheric surface) | $d_4$ = 0.380 | | |
| $r_5$ = 7.468 (aspheric surface) | $d_5$ = 0.820 | nd3 = 1.531 | $\upsilon d3$ = 56.04 |
| $r_6$ = −15.553 (aspheric surface) | $d_6$ = 0.876 | | |
| $r_7$ = −3.349 (aspheric surface) | $d_7$ = 1.339 | nd4 = 1.531 | $\upsilon d4$ = 56.04 |
| $r_8$ = −1.460 (aspheric surface) | $d_8$ = 0.336 | | |
| $r_9$ = −3.001 (aspheric surface) | $d_9$ = 0.800 | nd5 = 1.531 | $\upsilon d5$ = 56.04 |
| $r_{10}$ = 3.911 (aspheric surface) | $d_{10}$ = 1.263 | | |
| $r_{11}$ = ∞ (image plane) | | | |

Constant of cone ($\kappa$) and Aspheric coefficients (A, B, C, D, E, F, G)

(first plane)

$\kappa$ = 0.08,
A = −0.0006041, B = 0.0003786,
C = −0.0003650, D = 0.0000324,
E = 0.0000158, F = 0.0000061,
G = −0.0000046

(second plane)

$\kappa$ = 0.51,
A = −0.0014381, B = 0.0015709,
C = 0.0002381, D = −0.0000063,
E = −0.0000060, F = −0.0000167,
G = 0.0000028

-continued (third plane)

$\kappa = 10.85$,
A = 0.0059194, B = 0.0021708,
C = −0.0000368, 0 = 0.0000659,
E = 0.0000577, F = 0.0000019,
G = −0.0000033
(fourth plane)

$\kappa = 3.41$,
A = 0.0062442, B = −0.0000670,
C = −0.0022988, D = 0.0012679,
E = −0.0015356, F = −0.0008275,
G = 0.0012178
(fifth plane)

$\kappa = -13.23$,
A = −0.0097302, B = 0.0001317,
C = −0.0020565, D = −0.0010210,
E = −0.0007831, F = −0.0001784,
G = 0.0016874
(sixth plane)

$\kappa = 143.98$,
A = −0.0222669, B = −0.0097720,
C = 0.0006997, D = 0.0001051,
E = −0.0012144, F = −0.0001847,
G = 0.0004291
(seventh plane)

$\kappa = 0.55$,
A = −0.0458856, B = −0.0010417,
C = −0.0074095, D = −0.0015231,
E = 0.0012205, F = 0.0000000,
G = 0.0000000
(eighth plane)

$\kappa = -1.51$,
A = 0.0117707, B = −0.0181185,
C = 0.0049420, D = −0.0012059,
E = 0.0001756, F = 0.0000000,
G = 0.0000000
(ninth plane)

$\kappa = 0.00$,
A = 0.0109931, B = −0.0016812,
C = −0.0016864, D = 0.0008255,
E = −0.0001155, F = 0.0000000,
G = 0.0000000
(tenth plane)

$\kappa = -25.78$,
A = −0.0171653, B = 0.0023182,
C = −0.0006087, D = 0.0000782,
E = −0.0000047, F = 0.0000000,
G = 0.0000000

Figure 2:
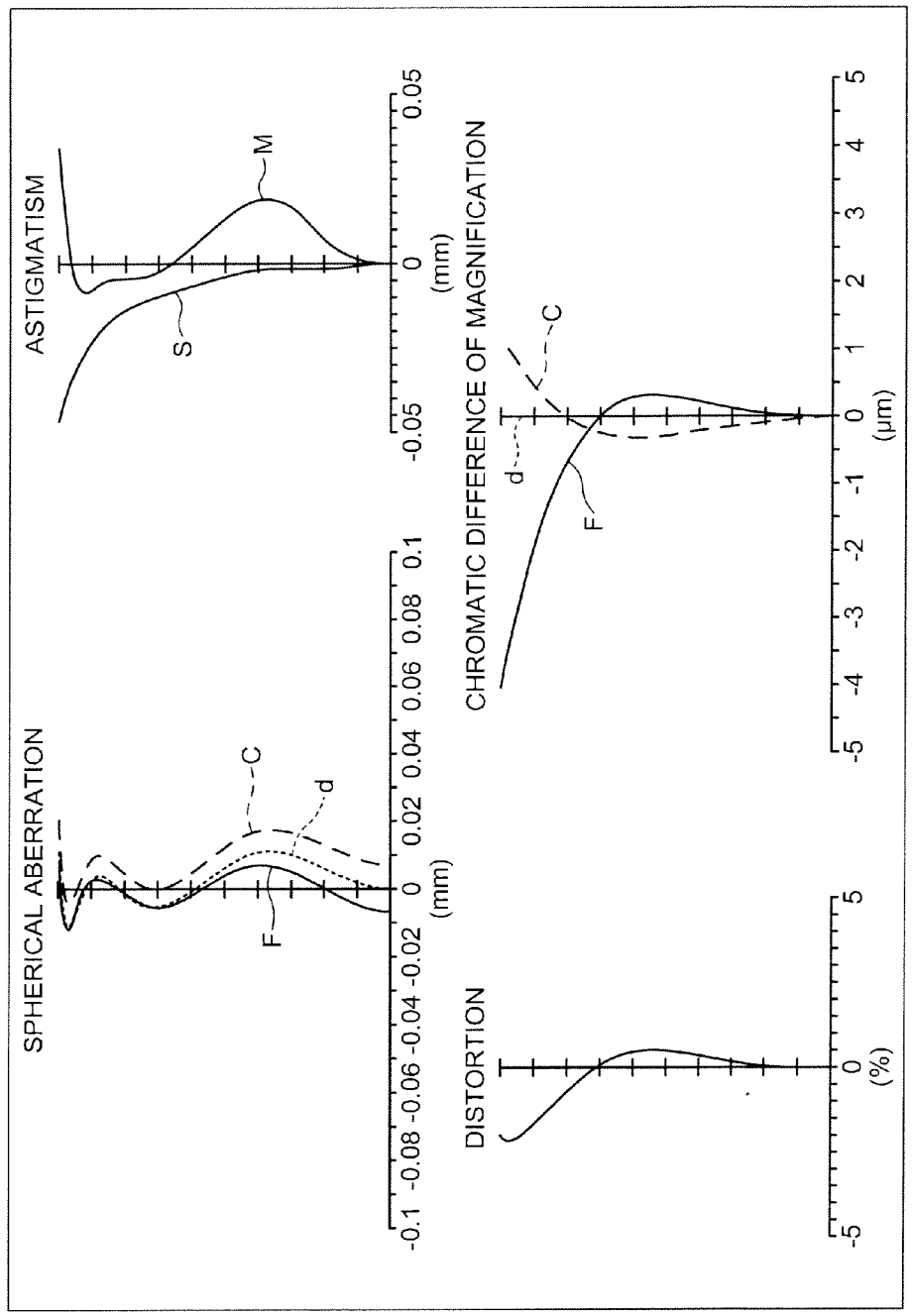
FIG. 2 is a diagram of spherical aberration, astigmatism, distortion, and chromatic difference of magnification for the imaging lens according to the first example.

FIG. 2 is a diagram of spherical aberration, astigmatism, distortion, and chromatic difference of magnification for the imaging lens according to the first example. FIG. 2 depicts wavelength aberration occurring at F-line (F) (λ=486 nm), d-line (d) (λ=588 nm), and C-line (C) (λ=656 nm). Reference symbols S and T used with respect to astigmatism indicate aberration in the sagittal direction and in the tangential direction, respectively.

Figure 3:
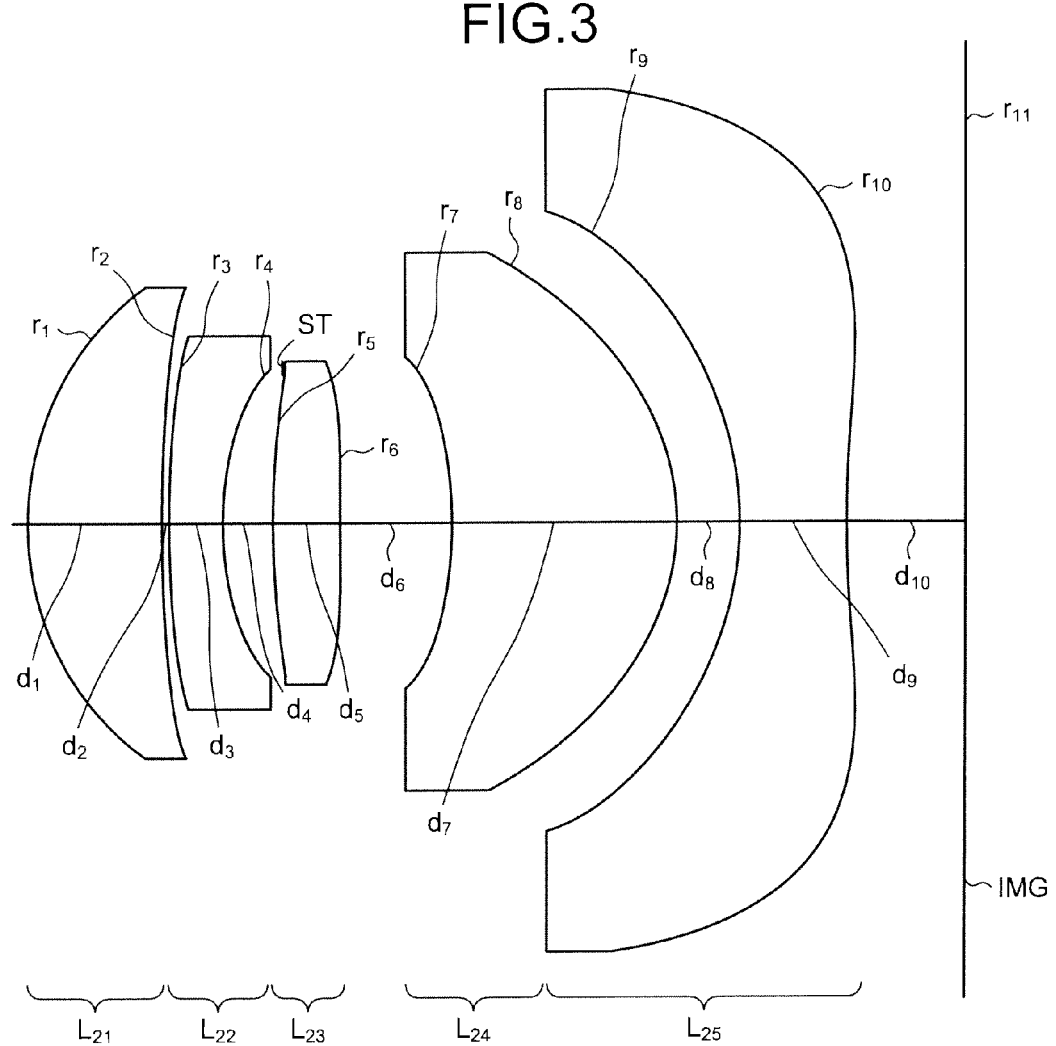
FIG. 3 is a cross sectional view (along the optical axis) of the imaging lens according to a second example.

FIG. 3 is a cross sectional view (along the optical axis) of the imaging lens according to a second example. The imaging lens includes, sequentially from the object, a positive first lens $L_{21}$, a negative second lens $L_{22}$, a biconvex third lens $L_{23}$, a fourth lens $L_{24}$ that is a meniscus lens having the convex surface facing toward the image plane IMG, and a fifth lens $L_{25}$ having a refractive power that gradually changes from negative at the lens center to positive at the lens periphery. The first lens $L_{21}$ and the second lens $L_{22}$ are disposed having an interval therebetween. Further, the first lens $L_{21}$ is formed of a glass material and the second lens $L_{22}$ to the fifth lens $L_{25}$ are formed of resin. Each surface of the first lens $L_{21}$ to the fifth lens $L_{25}$ is aspheric. At the surface on the object side of the third lens $L_{23}$, the aperture stop ST of a given diameter is disposed. At the image plane IMG, the optical receiving surface of an imaging device such as a CCD and CMOS is disposed.

Various values related to the imaging lens according to the second example are indicated below.

focal length of entire imaging lens system (f) = 6.2998
F number = 1.976
maximum angle of view: 60°
effective diameter of first lens $L_{21}$ (D) = 3.5
(Values related to conditional expression (1))
f/D = 1.799943
(Values related to conditional expression (2))
Abbe number for first lens $L_{21}$ (υd1) = 57.74
(Values related to conditional expression (3))
Abbe number for second lens $L_{22}$ (υd2) = 23.90

| | | | |
|---|---|---|---|
| $r_1$ = 2.199 (aspheric surface) | $d_1$ = 1.000 | nd1 = 1.610 | υd1 = 57.74 |
| $r_2$ = 16.490 (aspheric surface) | $d_2$ = 0.050 | | |
| $r_3$ = 10.309 (aspheric surface) | $d_3$ = 0.400 | nd2 = 1.634 | υd2 = 23.90 |
| $r_4$ = 2.565 (aspheric surface) | $d_4$ = 0.380 | | |
| $r_5$ = 6.384 (aspheric surface) | $d_5$ = 0.503 | nd3 = 1.531 | υd3 = 56.04 |
| $r_6$ = −46.383 (aspheric surface) | $d_6$ = 0.848 | | |
| $r_7$ = −3.879 (aspheric surface) | $d_7$ = 1.668 | nd4 = 1.531 | υd4 = 56.044 |
| $r_8$ = −1.679 (aspheric surface) | $d_8$ = 0.472 | | |
| $r_9$ = −2.611 (aspheric surface) | $d_9$ = 0.800 | nd5 = 1.531 | υd5 = 56.044 |
| $r_{10}$ = 5.539 (aspheric surface) | $d_{10}$ = 1.079 | | |
| $r_{11}$ = ∞ (image plane) | | | |

Constant of cone (κ) and Aspheric coefficients (A, B, C, D, E, F, G)

(first plane)

$\kappa = 0.11$,
A = −0.0013062, B = −0.0003092,
C = −0.0000090, D = 0.0000075,
E = −0.0000186, F = 0.0000039,
G = 0.0000008
(second plane)

$\kappa = 36.28$,
A = 0.0004887, B = 0.0030374,
C = 0.0002440, D = 0.0000109,
E = −0.0000169, F = −0.0000240,
G = 0.0000046
(third plane)

$\kappa = 16.71$,
A = 0.0049931, B = 0.0025315,
C = 0.0008979, D = 0.0000403,
E = −0.0000780, F = −0.0000504,
G = 0.0000080
(fourth plane)

$\kappa = 3.19$,
A = 0.0017553, B = 0.0040103,
C = −0.0106531, D = 0.0037206,
E = 0.0016027, F = 0.0001107,
G = −0.0010684
(fifth plane)

$\kappa = 11.10$,
A = −0.0069360, B = −0.0068979,
C = 0.0058637, D = −0.0007995,
E = −0.0029649, F = −0.0009082,
G = 0.0016058

-continued (sixth plane)

κ = 0.00,
A = −0.0181767, B = −0.0104707,
C = −0.0022959, D = 0.0013394,
E = −0.0016043, F = −0.0016309,
G = 0.0008445
(seventh plane)

κ = −1.09,
A = −0.0391121, B = −0.0068771,
C = −0.0120962, D = 0.0068933,
E = −0.0029722, F = 0.0000000,
G = 0.0000000
(eighth plane)

κ = −1.34,
A = 0.0089795, B = −0.0168271,
C = 0.0054541, D = −0.0012411,
E = 0.0001186, F = 0.0000000,
G = 0.0000000
(ninth plane)

κ = 0.00,
A = 0.0000196, B = 0.0016589,
C = −0.0017936, D = 0.0007214,
E = −0.0000865, F = 0.000000,
G = 0.0000000
(tenth plane)

κ = −49.64,
A = −0.0177242, B = 0.0030392,
C = −0.0008173, D = 0.0001034,
E = −0.0000054, F = 0.0000000,
G = 0.0000000

Figure 4:
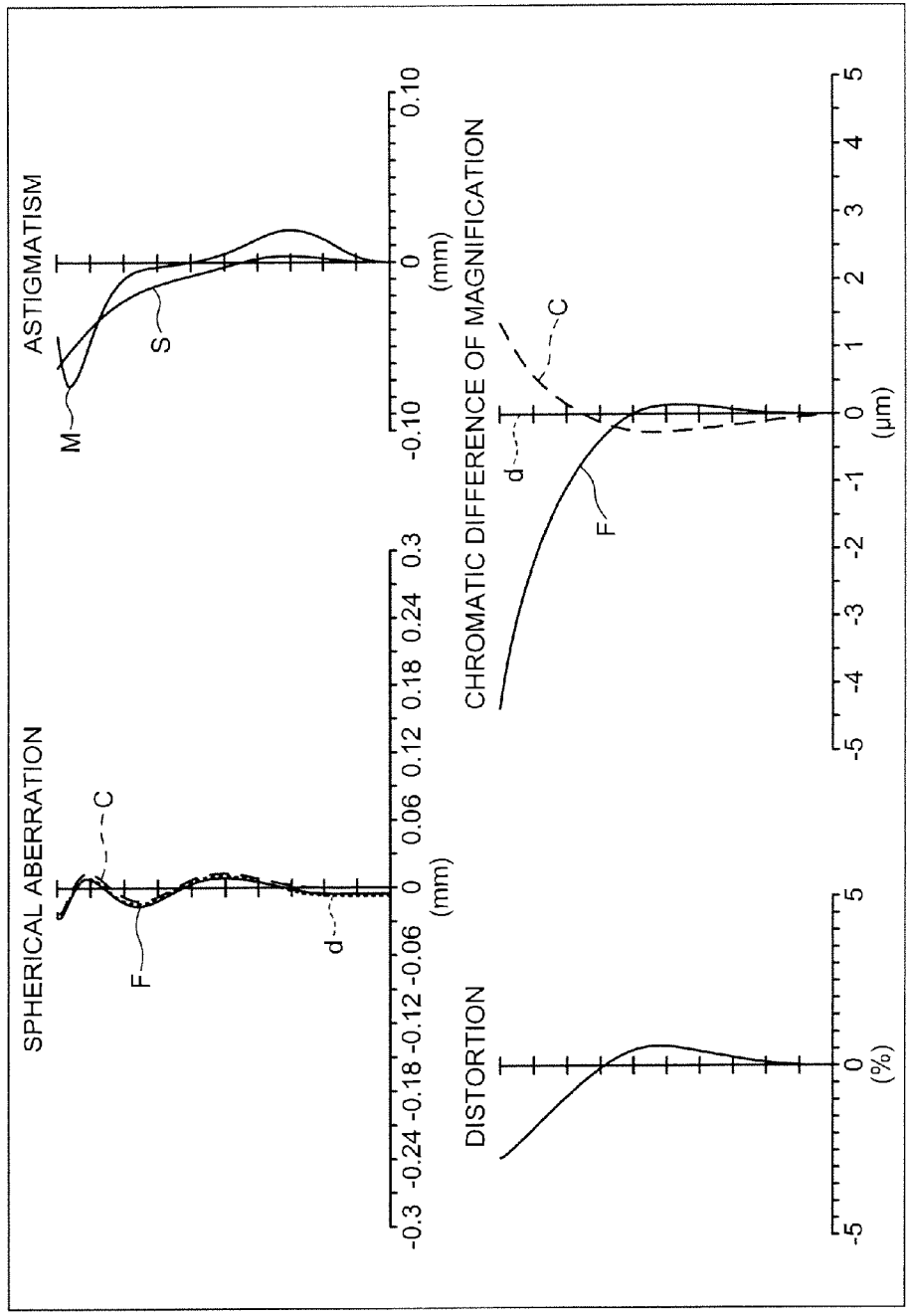
FIG. 4 is a diagram of spherical aberration, astigmatism, distortion, and chromatic difference of magnification for the imaging lens according to the second example.

FIG. 4 is a diagram of spherical aberration, astigmatism, distortion, and chromatic difference of magnification for the imaging lens according to the second example. FIG. 4 depicts wavelength aberration occurring at F-line (F) (λ=486 nm), d-line (d) (λ=588 nm), and C-line (C) (λ=656 nm). Reference symbols S and T used with respect to astigmatism indicate aberration in the sagittal direction and in the tangential direction, respectively.

Figure 5:
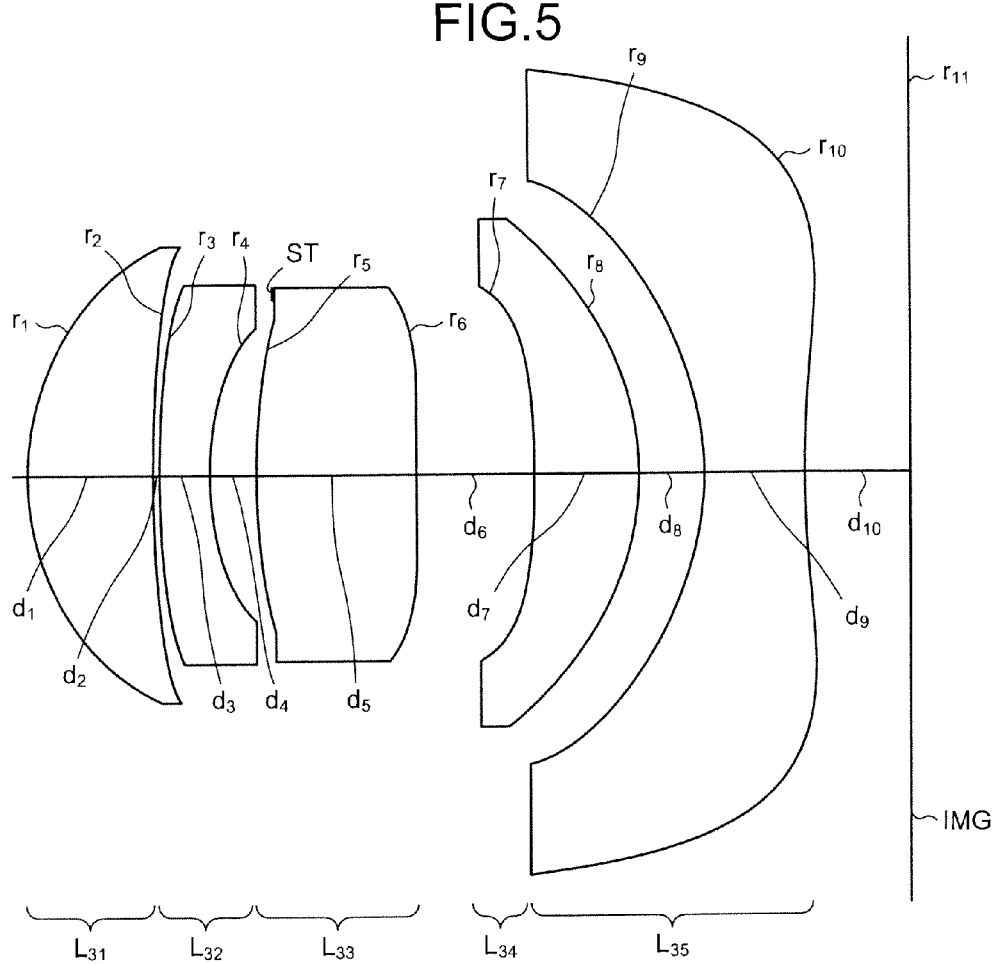
FIG. 5 is a cross sectional view (along the optical axis) of the imaging lens according to a third example.

FIG. 5 is a cross sectional view (along the optical axis) of the imaging lens according to a third example. The imaging lens includes, sequentially from the object, a positive first lens $L_{31}$, a negative second lens $L_{32}$, a biconvex third lens $L_{33}$, a fourth lens $L_{34}$ that is a meniscus lens having the convex surface facing toward the image plane IMG, and a fifth lens $L_{35}$ having a refractive power that gradually changes from negative at the lens center to positive at the lens periphery. The first lens $L_{31}$ and the second lens $L_{32}$ are disposed having an interval therebetween. Further, the first lens $L_{31}$ to the fifth lens $L_{35}$ are formed of resin. Each surface of the first lens $L_{31}$ to the fifth lens $L_{35}$ is aspheric. At the surface on the object side of the third lens $L_{33}$, the aperture stop ST of a given diameter is disposed. At the image plane IMG, the optical receiving surface of an imaging device such as a CCD and CMOS is disposed.

Various values related to the imaging lens according to the third example are indicated below.

focal length of entire imaging lens system (f) = 6.2998
F number = 1.984
maximum angle of view: 60°
effective diameter of first lens $L_{31}$ (D) = 3.6
(Values related to conditional expression (1))
f/D = 1.749944
(Values related to conditional expression (2))

-continued

Abbe number for first lens $L_{31}$ (υd1) = 56.04
(Values related to conditional expression (3))
Abbe number for second lens $L_{32}$ (υd2) = 23.90

$r_1$ = 2.199 (aspheric surface)   $d_1$ = 1.000   nd1 = 1.531   υd1 = 56.04
$r_2$ = 16.490 (aspheric surface)   $d_2$ = 0.050
$r_3$ = 10.309 (aspheric surface)   $d_3$ = 0.400   nd2 = 1.634   υd2 = 23.90
$r_4$ = 2.565 (aspheric surface)   $d_4$ = 0.380
$r_5$ = 6.384 (aspheric surface)   $d_5$ = 0.503   nd3 = 1.531   υd3 = 56.04
$r_6$ = −46.383 (aspheric surface)   $d_6$ = 0.848
$r_7$ = −3.879 (aspheric surface)   $d_7$ = 1.668   nd4 = 1.531   υd4 = 56.04
$r_8$ = −1.679 (aspheric surface)   $d_8$ = 0.472
$r_9$ = −2.611 (aspheric surface)   $d_9$ = 0.800   nd5 = 1.531   υd5 = 56.04
$r_{10}$ = 5.539 (aspheric surface)   $d_{10}$ = 1.079
$r_{11}$ = ∞ (image plane)

Constant of cone (κ) and Aspheric coefficients (A, B, C, D, E, F, G)

(first plane)

κ = 0.11,
A = −0.0013062, B = −0.0003092,
C = −0.0000090, D = 0.0000075,
E = −0.0000186, F = 0.0000039,
G = 0.0000008
(second plane)

κ = 36.28,
A = 0.0004887, B = 0.0030374,
C = 0.0002440, D = 0.0000109,
E = −0.0000169, F = −0.0000240,
G = 0.0000046
(third plane)

κ = 16.71,
A = 0.0049931, B = 0.0025315,
C = 0.0008979, D = 0.0000403,
E = −0.0000780, F = −0.0000504,
G = 0.0000080
(fourth plane)

κ = 3.19,
A = 0.0017553, B = 0.0040103,
C = −0.0106531, D = 0.0037206,
E = 0.0016027, F = 0.0001107,
G = −0.0010684
(fifth plane)

κ = 11.10,
A = −0.0069360, B = −0.0068979,
C = 0.0058637, D = −0.0007995,
E = −0.0029649, F = −0.0009082,
G = 0.0016058
(sixth plane)

κ = 0.00,
A = −0.0181767, B = −0.0104707,
C = −0.0022959, D = 0.0013394,
E = −0.0016043, F = −0.0016309,
G = 0.0008445
(seventh plane)

κ = −1.09,
A = −0.0391121, B = −0.0068771,
C = −0.0120962, D = 0.0068933,
E = −0.0029722, F = 0.0000000,
G = 0.0000000
(eighth plane)

κ = −1.34,
A = 0.0089795, B = −0.0168271,
C = 0.0054541, D = −0.0012411,
E = 0.0001186, F = 0.0000000,
G = 0.0000000
(ninth plane)

κ = 0.00,
A = 0.0000196, B = 0.0016589,
C = −0.0017936, D = 0.0007214,

-continued

E = −0.0000865, F = 0.0000000,
G = 0.0000000
(tenth plane)

κ = −49.64,
A = −0.0177242, B = 0.0030392,
C = −0.0008173, D = 0.0001034,
E = −0.0000054, F = 0.0000000,
G = 0.0000000

Figure 6:
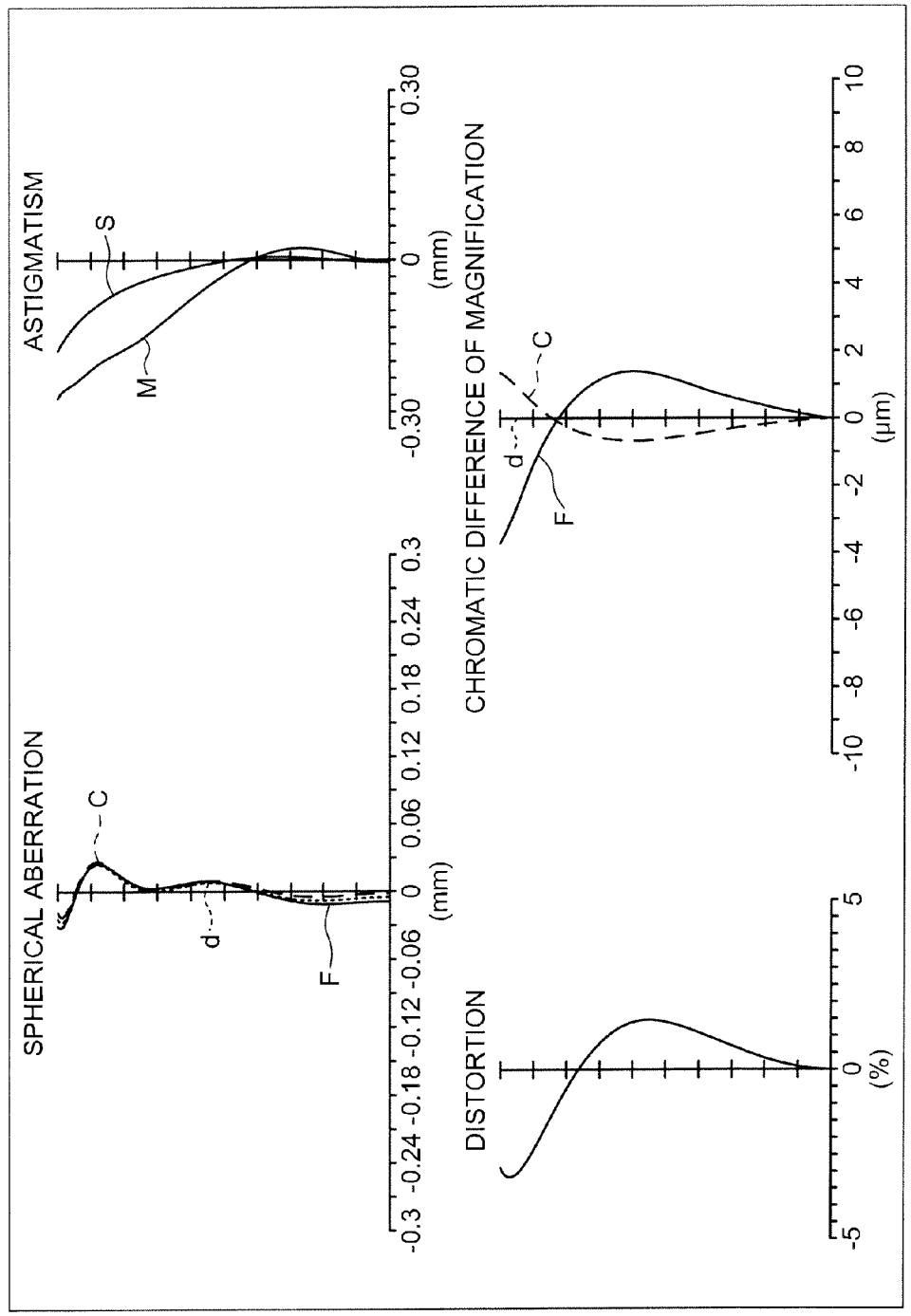
FIG. 6 is a diagram of spherical aberration, astigmatism, distortion, and chromatic difference of magnification for the imaging lens according to the third example.

FIG. 6 is a diagram of spherical aberration, astigmatism, distortion, and chromatic difference of magnification for the imaging lens according to the third example. FIG. 6 depicts wavelength aberration occurring at F-line (F) (λ=486 nm), d-line (d) (λ=588 nm), and C-line (C) (λ=656 nm). Reference symbols S and T used with respect to astigmatism indicate aberration in the sagittal direction and in the tangential direction, respectively.

Figure 7:
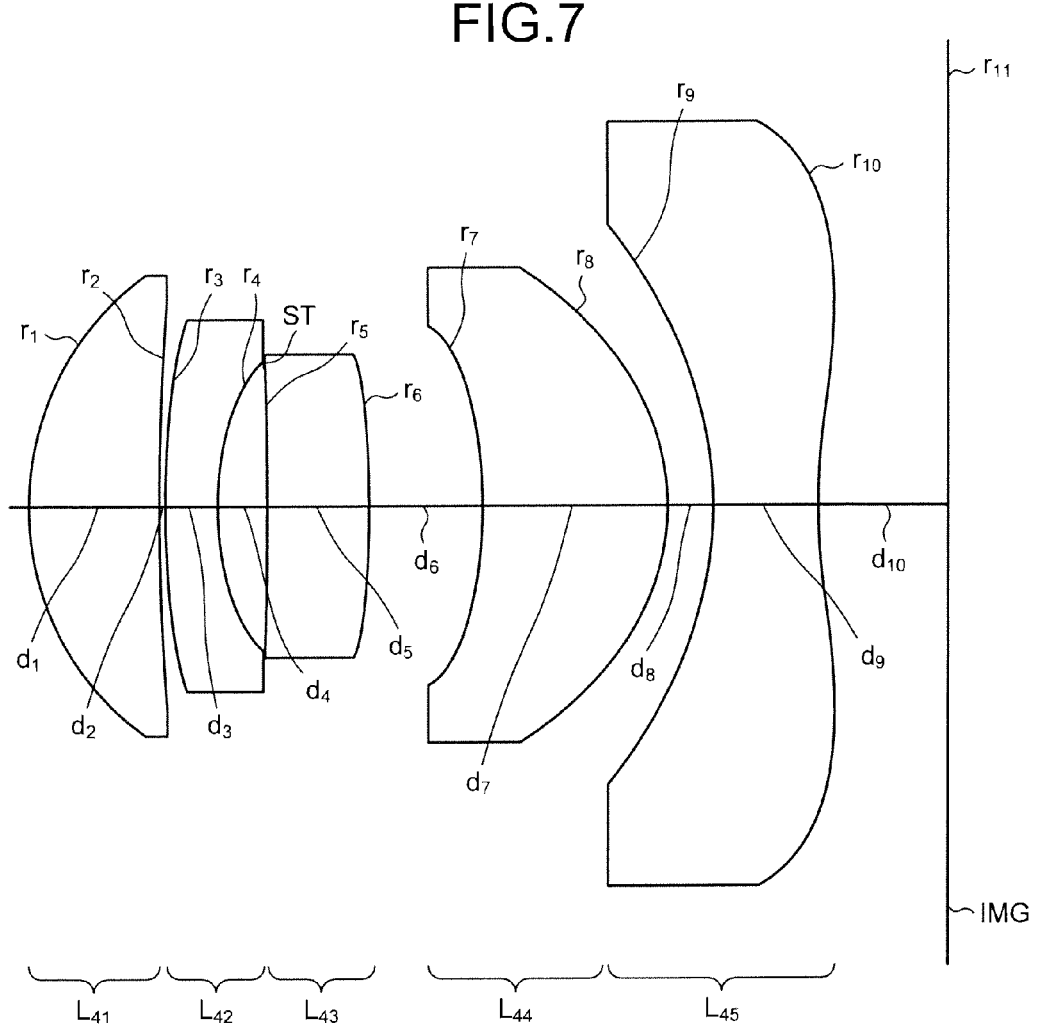
FIG. 7 is a cross sectional view (along the optical axis) of the imaging lens according to a fourth example

FIG. 7 is a cross sectional view (along the optical axis) of the imaging lens according to a fourth example. The imaging lens includes, sequentially from the object, a positive first lens $L_{41}$, a negative second lens $L_{42}$, a positive third lens $L_{43}$ having a convex surface facing toward the image plane IMG, a fourth lens $L_{44}$ that is a meniscus lens having the convex surface facing toward the image plane IMG, a fifth lens $L_{45}$ having a refractive power that gradually changes from negative at the lens center to positive at the lens periphery. The first lens $L_{41}$ and the second lens $L_{42}$ are disposed having an interval therebetween. Further, the first lens $L_{41}$ to the fifth lens $L_{45}$ are formed of resin. Each surface of the first lens $L_{41}$ to the fifth lens $L_{45}$ is aspheric. At the surface on the object side of the third lens $L_{43}$, the aperture stop ST of a given diameter is disposed. At the image plane IMG, the optical receiving surface of an imaging device such as a CCD and CMOS is disposed.

Various values related to the imaging lens according to the fourth example are indicated below.

focal length of entire imaging lens system (f) = 6.30
F number = 2
maximum angle of view: 59°
effective diameter of first lens $L_{41}$ (D) = 3.433
(Values related to conditional expression (1))
f/D = 1.834858
(Values related to conditional expression (2))
Abbe number for first lens $L_{41}$ (υd1) = 56.04
(Values related to conditional expression (3))
Abbe number for second lens $L_{42}$ (υd2) = 23.90

| | | | |
|---|---|---|---|
| $r_1$ = 2.139 (aspheric surface) | $d_1$ = 1.000 | nd1 = 1.531 | υd1 = 56.04 |
| $r_2$ = 23.406 (aspheric surface) | $d_2$ = 0.050 | | |
| $r_3$ = 8.970 (aspheric surface) | $d_3$ = 0.400 | nd2 = 1.634 | υd2 = 23.90 |
| $r_4$ = 2.521 (aspheric surface) | $d_4$ = 0.380 | | |
| $r_5$ = ∞ (aspheric surface) | $d_5$ = 0.787 | nd3 = 1.531 | υd3 = 56.04 |
| $r_6$ = −13.394 (aspheric surface) | $d_6$ = 0.876 | | |
| $r_7$ = −5.199 (aspheric surface) | $d_7$ = 1.415 | nd4 = 1.531 | υd4 = 56.04 |
| $r_8$ = −1.500 (aspheric surface) | $d_8$ = 0.348 | | |
| $r_9$ = −2.587 (aspheric surface) | $d_9$ = 0.800 | nd5 = 1.531 | υd5 = 56.04 |
| $r_{10}$ = 3.752 (aspheric surface) | $d_{10}$ = 1.144 | | |
| $r_{11}$ = ∞ (image plane) | | | |

Constant of cone (K) and Aspheric coefficients (A, B, C, D, E, F, G)

(first plane)

κ = 0.091993,
A = −0.000377, B = 0.0003484,
C = −0.000409, D = 4.03 × $10^{-5}$,
E = 1.92 × 10−5, F = 2.92 × $10^{-6}$,
G = −6.42 × $10^{-6}$
(second plane)

κ = 3.004417,
A = −0.001343, B = 0.0018782,
C = 4.31 × 10−6, D = −9.94 × $10^{-5}$,
E = 2.86 × 10−6, F = −8.51 × $10^{-6}$,
G = 2.36 × $10^{-6}$
(third plane)

κ = 5.723884,
A = 0.0042841, B = 0.0014709,
C = 0.0004289, D = 0.0003577,
E = −1.87 × 10−5, F = −7.37 × $10^{-5}$,
G = 2.83 × $10^{-5}$
(fourth plane)

κ = 3.589254,
A = 0.00452115, B = −0.0020165,
C = −0.0020371, D = 0.00072772,
E = −0.0029891, F = −0.0014832,
G = 0.00290421
(fifth plane)

κ = 0.000000,
A = −0.01023, B = −0.00161,
C = −0.00262, D = −0.00073,
E = −0.00115, F = −0.00061,
G = 0.003092
(sixth plane)

κ = 121.253700,
A = −0.01387, B = −0.0094,
C = 0.002263, D = 0.000185,
E = −0.00232, F = −0.00091,
G = 0.001487
(seventh plane)

κ = −1.539267,
A = −0.03789, B = −0.00155,
C = −0.00707, D = 0.000587,
E = −0.00062, F = 0,
G = 0
(eighth plane)

κ = −1.785940,
A = 0.010268, B = −0.01719,
C = 0.005031, D = −0.00137,
E = 0.000142, F = 0,
G = 0
(ninth plane)

κ = 0.000000,
A = 0.0213538, B = −0.000798,
C = −0.001943, D = 0.0007509,
E = −7.87 × 10−5, F = 0,
G = 0
(tenth plane)

κ = −26.264130,
A = −0.0155256, B = 0.0028474,
C = −0.0007346, D = 8.94 × $10^{-5}$,
E = −4.49 × 10−6, F = 0,
G = 0

Figure 8:
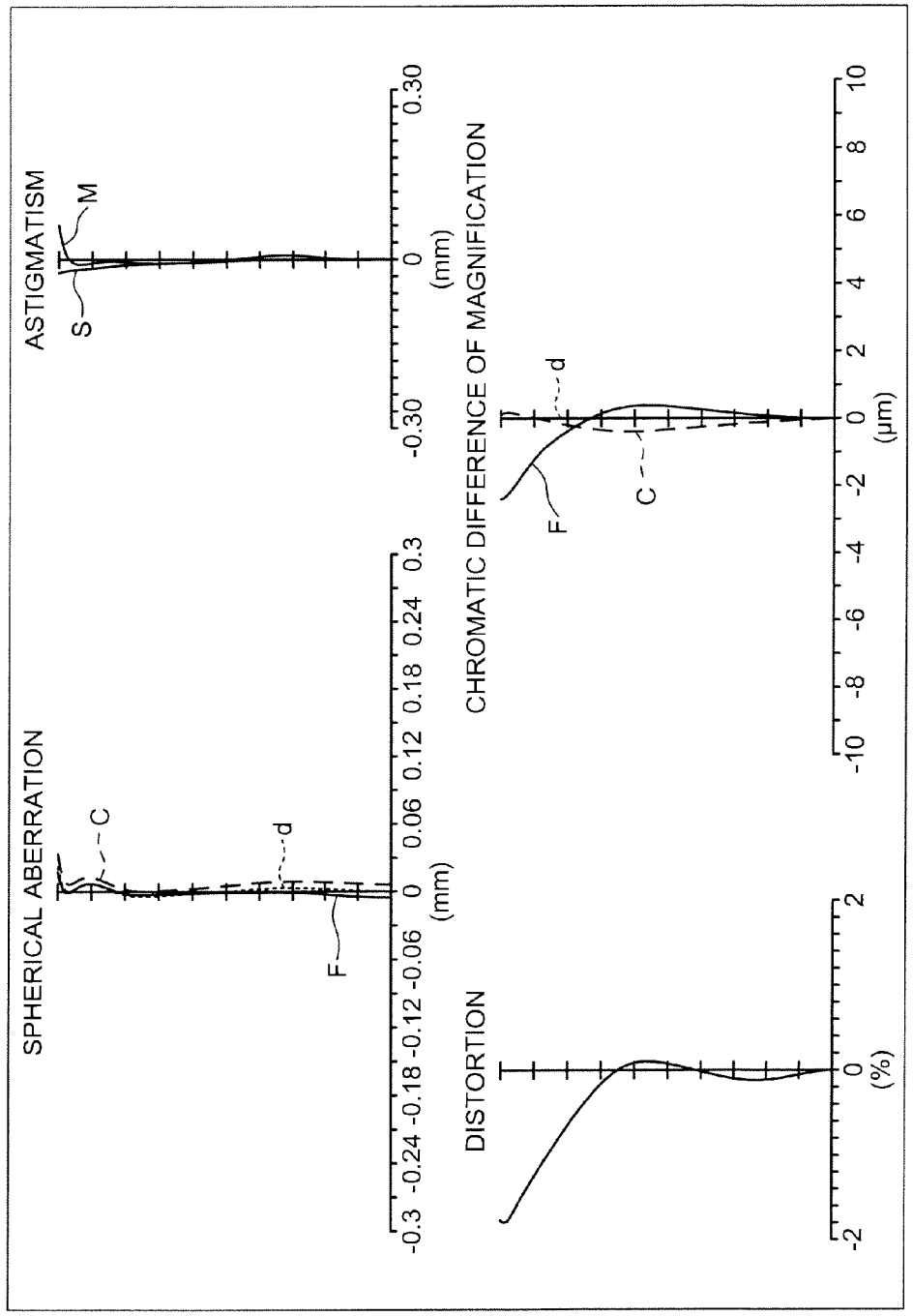
FIG. 8 is a diagram of spherical aberration, astigmatism, distortion, and chromatic difference of magnification for the imaging lens according to the fourth example.

FIG. 8 is a diagram of spherical aberration, astigmatism, distortion, and chromatic difference of magnification for the imaging lens according to the fourth example. FIG. 8 depicts wavelength aberration occurring at F-line (F) (λ=486 nm), d-line (d) (λ=588 nm), and C-line (C) (λ=656 nm). Reference symbols S and T used with respect to astigmatism indicate aberration in the sagittal direction and in the tangential direction, respectively.

Figure 9:
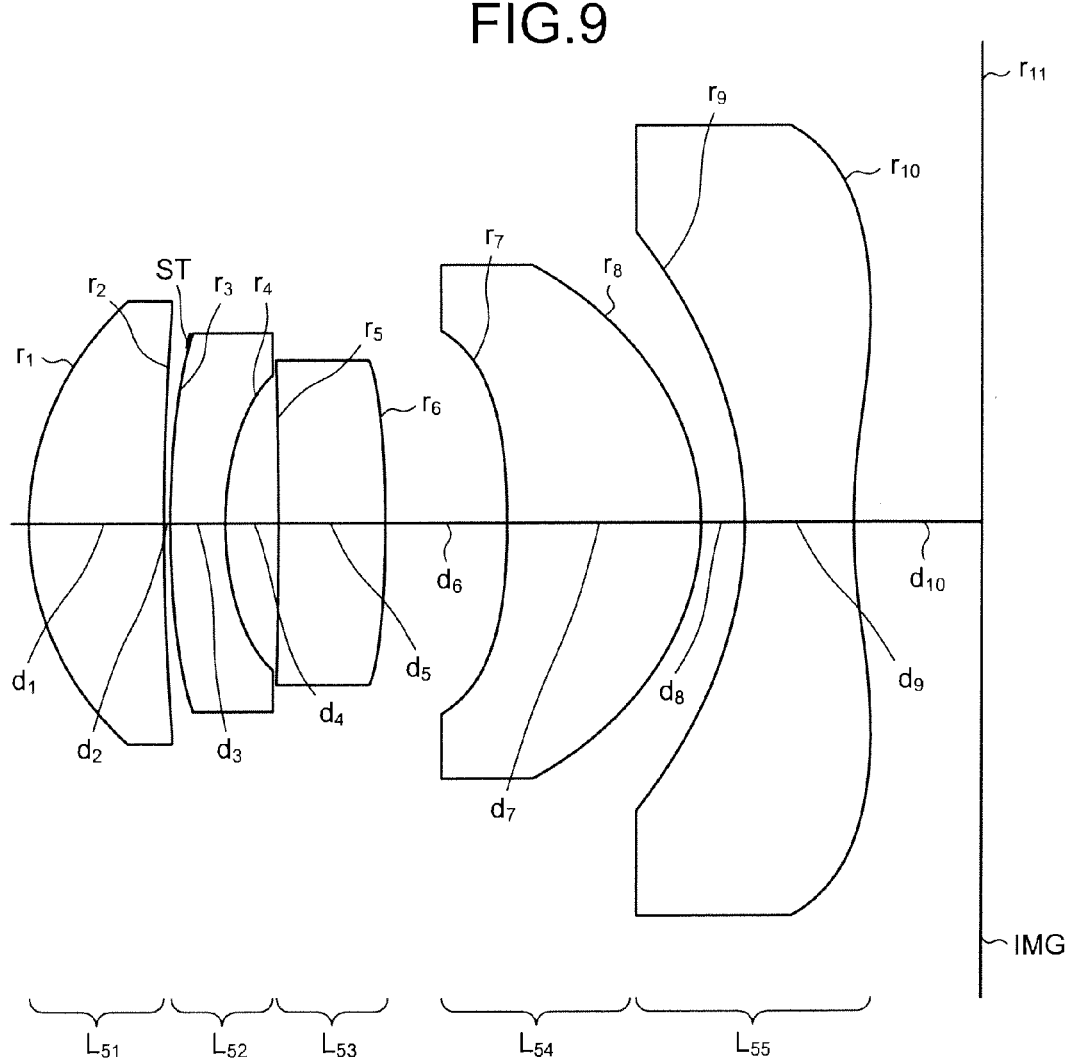
FIG. 9 is a cross sectional view (along the optical axis) of the imaging lens according to a fifth example.

FIG. 9 is a cross sectional view (along the optical axis) of the imaging lens according to a fifth example. The imaging lens includes, sequentially from the object, a positive first lens $L_{51}$, a negative second lens $L_{52}$, a biconvex third lens $L_{53}$, a fourth lens $L_{54}$ that is a meniscus lens having the convex surface facing toward the image plane IMG, a fifth lens $L_{55}$ having a refractive power that gradually changes from negative at the lens center to positive at the lens periphery. The first lens $L_{51}$ and the second lens $L_{52}$ are disposed having an interval therebetween. Further, the first lens $L_{51}$ to the fifth lens $L_{55}$ are formed of resin. Each surface of the first lens $L_{51}$ to the fifth lens $L_{55}$ is aspheric. At the surface on the object side of the second $L_{52}$, the aperture stop ST of a given diameter is disposed. At the image plane IMG, the optical receiving surface of an imaging device such as a CCD and CMOS is disposed.

Various values related to the imaging lens according to the fifth example are indicated below.

focal length of entire imaging lens system (f) = 6.2998
F number = 1.976
maximum angle of view: 60°
effective diameter of first lens $L_{51}$ (D) = 3.26
(Values related to conditional expression (1))
f/D = 1.932453988
(Values related to conditional expression (2))
Abbe number for first lens $L_{51}$ (υd1) = 56.04
(Values related to conditional expression (3))
Abbe number for second lens $L_{52}$ (υd2) = 23.90

$r_1$ = 2.14 (aspheric surface)   $d_1$ = 1.00   nd1 = 1.531   υd1 = 56.04
$r_2$ = 23.52 (aspheric surface)  $d_2$ = 0.05
$r_3$ = 9.00 (aspheric surface)   $d_3$ = 0.40   nd2 = 1.634   υd2 = 23.90
$r_4$ = 2.52 (aspheric surface)   $d_4$ = 0.38
$r_5$ = 1733.55 (aspheric surface) $d_5$ = 0.81   nd3 = 1.531   υd3 = 56.04
$r_6$ = −13.35 (aspheric surface)  $d_6$ = 0.88
$r_7$ = −5.48 (aspheric surface)   $d_7$ = 1.45   nd4 = 1.531   υd4 = 56.04
$r_8$ = −1.52 (aspheric surface)   $d_8$ = 0.34
$r_9$ = −2.54 (aspheric surface)   $d_9$ = 0.80   nd5 = 1.531   υd5 = 56.04
$r_{10}$ = 3.74 (aspheric surface) $d_{10}$ = 1.10
$r_{11}$ = ∞ (image plane)

Constant of cone (K) and Aspheric coefficients (A, B, C, D, E, F, G)

(first plane)

κ = 0.093,
A = −0.000292, B = 0.0003583,
C = −0.000416, D = 3.84 × $10^{-5}$,
E = 1.90 × $10^{-5}$, F = 3.19 × $10^{-6}$,
G = −6.17 × $10^{-6}$
(second plane)

κ = 1.159,
A = −0.001365, B = 0.0018799,
C = 3.11 × $10^{-6}$, D = −0.000104,
E = 4.25 × $10^{-7}$, F = −8.59 × $10^{-6}$,
G = 3.50 × $10^{-6}$
(third plane)

κ = 5.677,
A = 0.0042561, B = 0.0014188,
C = 0.0004077, D = 0.000339,
E = −1.69 × $10^{-5}$, F = −7.12 × $10^{-5}$,
G = 2.87 × $10^{-5}$
(fourth plane)

κ = 3.574,
A = 0.00458149, B = −0.0019315,
C = −0.0018153, D = 0.00094302,
E = −0.0029539, F = −0.0017556,
G = 0.00227252
(fifth plane)

κ = 0.000,
A = −0.01004, B = −0.00157,
C = −0.00276, D = −0.001,
E = −0.00145, F = −0.00082,
G = 0.002941

(sixth plane)

κ = 120.807,
A = −0.01377, B = −0.00964,
C = 0.002202, D = 0.000276,
E = −0.00223, F = −0.00088,
G = 0.001439
(seventh plane)

κ = −1.877,
A = −0.0376194, B = −0.0016227,
C = −0.0071613, D = 0.00057162,
E = −0.0006068, F = 0.0000000,
G = 0.0000000
(eighth plane)

K = −1.816,
A = 0.010348, B = −0.01723,
C = 0.005048, D = −0.00136,
E = 0.000143, F = 0,
G = 0
(ninth plane)

κ = 0.000,
A = 0.0211814, B = −0.00063,
C = −0.00192, D = 0.0007527,
E = −7.82 × $10^{-5}$, F = 0,
G = 0
(tenth plane)

κ = −27.270,
A = −0.015234, B = 0.0028769,
C = −0.000734, D = 8.96 × $10^{-5}$,
E = −4.53 × $10^{-6}$, F = 0,
G = 0

Figure 10:
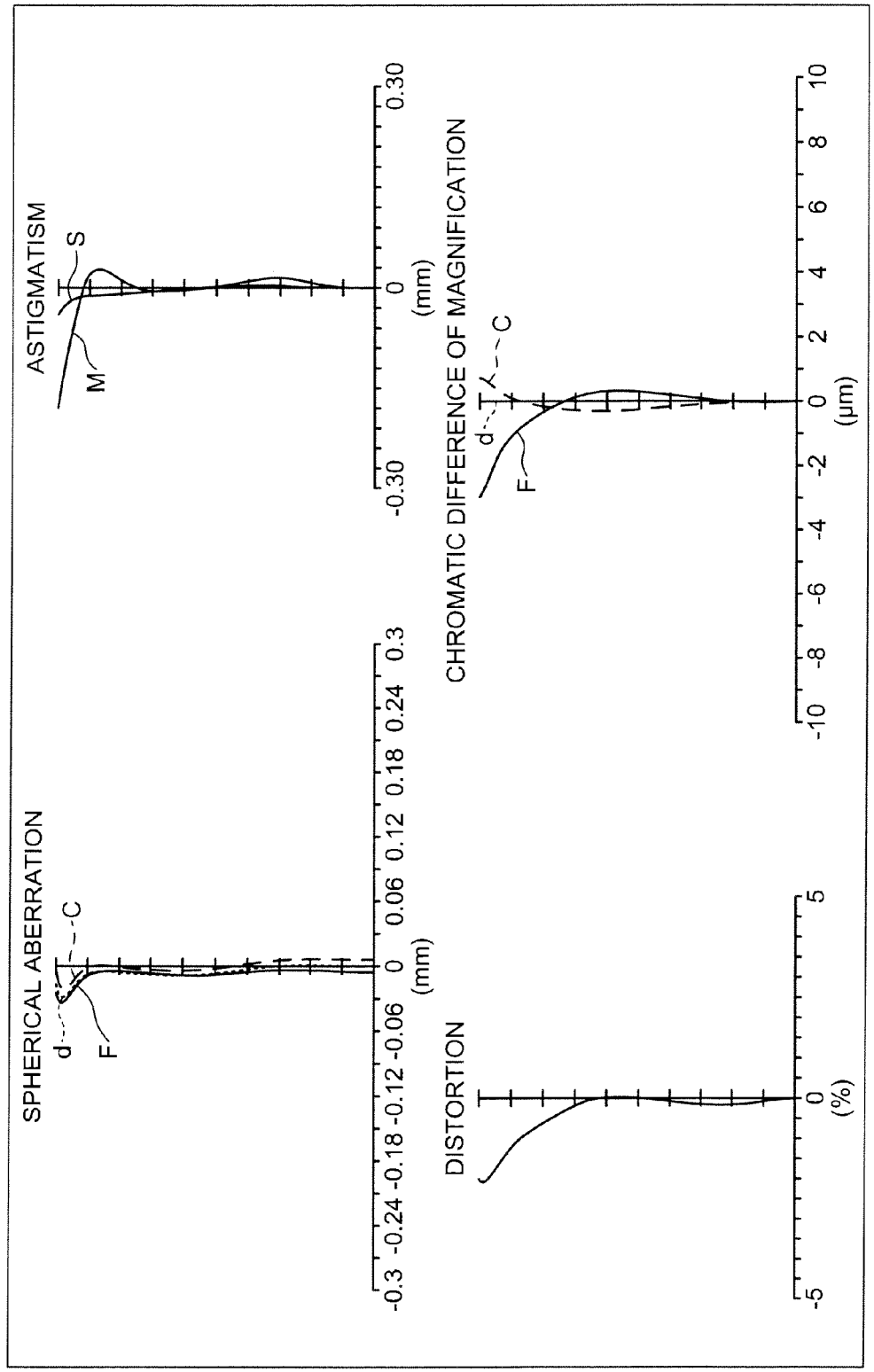
FIG. 10 is a diagram of spherical aberration, astigmatism, distortion, and chromatic difference of magnification for the imaging lens according to the fifth example.

FIG. 10 is a diagram of spherical aberration, astigmatism, distortion, and chromatic difference of magnification for the imaging lens according to the fifth example. FIG. 10 depicts wavelength aberration occurring at F-line (F) (λ=486 nm), d-line (d) (λ=588 nm), and C-line (c) (λ=656 nm). Reference symbols S and T used with respect to astigmatism indicate aberration in the sagittal direction and in the tangential direction, respectively.

Figure 11:
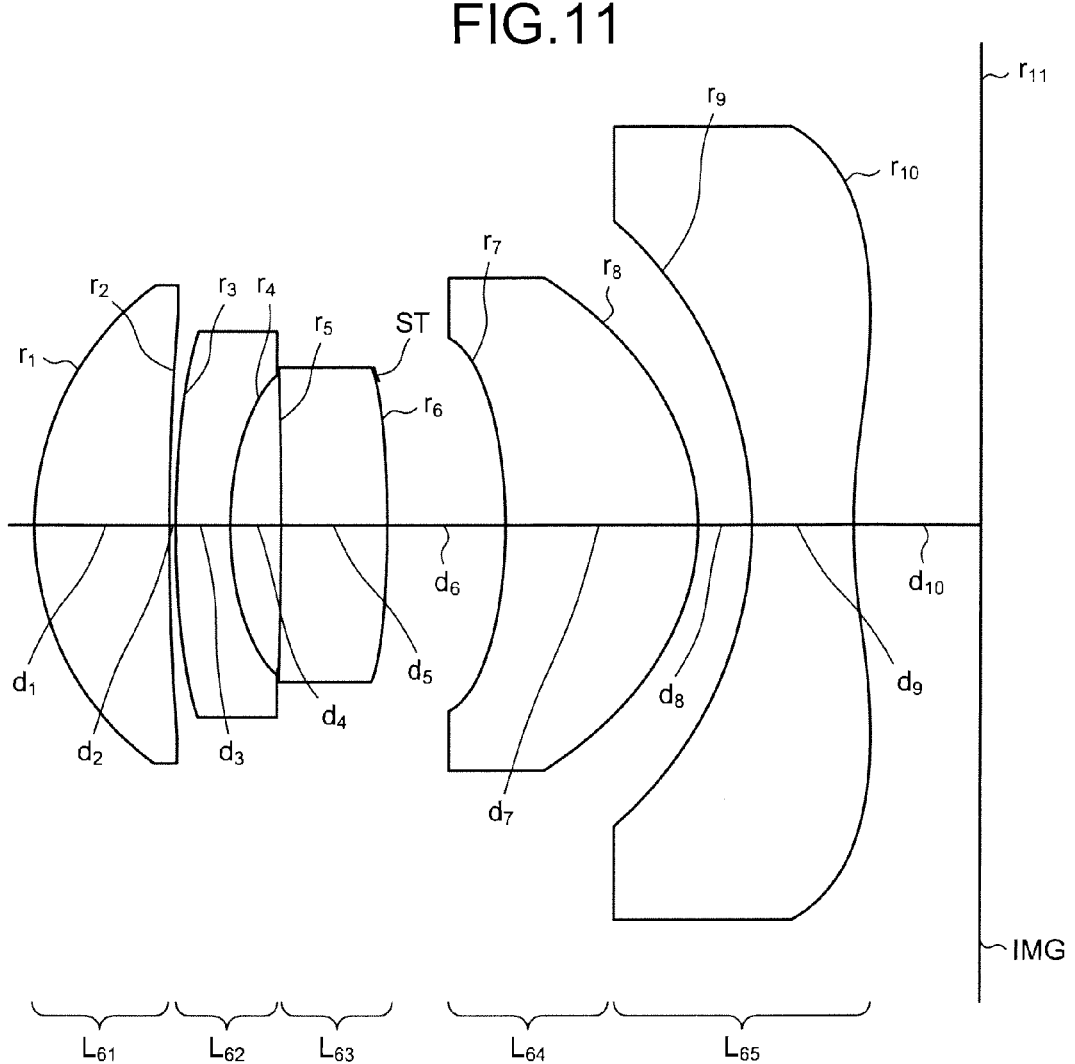
FIG. 11 is a cross sectional view (along the optical axis) of the imaging lens according to a sixth example.

FIG. 11 is a cross sectional view (along the optical axis) of the imaging lens according to a sixth example. The imaging lens includes, sequentially from the object, a positive first lens $L_{61}$, a negative second lens $L_{62}$, a biconvex third lens $L_{63}$, a fourth lens $L_{64}$ that is a meniscus lens having the convex surface facing toward the image plane IMG, a fifth lens $L_{65}$ having a refractive power that gradually changes from negative at the lens center to positive at the lens periphery. The first lens $L_{61}$ and the second lens $L_{62}$ are disposed having an interval therebetween. Further, the first lens $L_{61}$ to the fifth lens $L_{65}$ are formed of resin. Each surface of the first lens $L_{61}$ to the fifth lens $L_{65}$ is aspheric. At the surface on the image plane IMG side of the third lens $L_{63}$, the aperture stop ST of a given diameter is disposed. At the image plane IMG, the optical receiving surface if an imaging device such as a CCD and CMOS is disposed.

Various values related to the imaging lens according to the sixth example are indicated below.

focal length of entire imaging lens system (f) = 6.2998
F number = 1.9783
maximum angle of view: 60°
effective diameter of first lens $L_{61}$ (D) = 3.424
(Values related to conditional expression (1))
f/D = 1.837748
(Values related to conditional expression (2))

| Abbe number for first lens $L_{61}$ ($vd1$) = 56.04 |
| --- |
| (Values related to conditional expression (3)) |
| Abbe number for second lens $L_{62}$ ($vd2$) = 23.90 |

| $r_1$ = 2.135342 (aspheric surface) | $d_1$ = 1 | nd1 = 1.531 | υd1 = 56.04 |
| --- | --- | --- | --- |
| $r_2$ = 23.5182 (aspheric surface) | $d_2$ = 0.05 | | |
| $r_3$ = 8.996983 (aspheric surface) | $d_3$ = 0.4 | nd2 = 1.634 | υd2 = 23.90 |
| $r_4$ = 2.523297 (aspheric surface) | $d_4$ = 0.38 | | |
| $r_5$ = 1733.546 (aspheric surface) | $d_5$ = 0.8113935 | nd3 = 1.531 | υd3 = 56.04 |
| $r_6$ = −13.3506 (aspheric surface) | $d_6$ = 0.876499 | | |
| $r_7$ = −5.48102 (aspheric surface) | $d_7$ = 1.448892 | nd4 = 1.531 | υd4 = 56.04 |
| $r_8$ = −1.52478 (aspheric surface) | $d_8$ = 0.3448889 | | |
| $r_9$ = −2.54172 (aspheric surface) | $d_9$ = 0.8 | nd5 = 1.531 | υd5 = 56.04 |
| $r_{10}$ = 3.744833 (aspheric surface) | $d_{10}$ = 1.097343 | | |
| $r_{11}$ = ∞ (image plane) | | | |

Constant of cone (K) and Aspheric coefficients (A, B, C, D, E, F, G)

(first plane)

κ = 0.092807,
A = −0.0002919, B = 0.0003583,
C = −0.0004158, D = 3.84 × $10^{-5}$,
E = 1.90 × 10−5, F = 3.19 × $10^{-6}$,
G = −6.17 × $10^{-6}$
(second plane)

κ = 1.158928,
A = −0.0013646, B = 0.00187991,
C = 3.11 × 10−6, D = −0.0001042,
E = 4.25 × 10−7, F = −8.59 × $10^{-6}$,
G = 3.50 × $10^{-6}$
(third plane)

κ = 5.67726,
A = 0.00425609, B = 0.00141876,
C = 0.0004077, D = 0.00033899,
E = −1.69 × 10−5, F = −7.12 × $10^{-5}$,
G = 2.87 × $10^{-5}$
(fourth plane)

κ = 3.573937,
A = 0.004581, B = −0.00193,
C = −0.00182, D = 0.000943,
E = −0.00295, F = −0.00176,
G = 0.002273
(fifth plane)

κ = 0,
A = −0.01004, B = −0.00157,
C = −0.00276, D = −0.001,
E = −0.00145, F = −0.00082,
G = 0.002941
(sixth plane)

κ = 120.8066,
A = −0.0137696, B = −0.0096434,
C = 0.00220205, D = 0.00027593,
E = −0.0022263, F = −0.0008801,
G = 0.0014392
(seventh plane)

κ = −1.8774,
A = −0.0376194, B = −0.0016227,
C = −0.0071613, D = 0.00057162,
E = −0.0006068, F = 0.0000000,
G = 0.0000000

(eighth plane)

κ = −1.81592,
A = 0.010348, B = −0.01723,
C = 0.005048, D = −0.00136,
E = 0.000143, F = 0,
G = 0
(ninth plane)

κ = 0,
A = 0.02118137, B = −0.0006301,
C = −0.0019201, D = 0.00075273,
E = −7.82 × 10−5, F = 0,
G = 0
(tenth plane)

κ = −27.2705,
A = −0.0152344, B = 0.00287693,
C = −0.0007336, D = 8.96 × $10^{-5}$,
E = −4.53 × 10−6, F = 0,
G = 0

Figure 12:
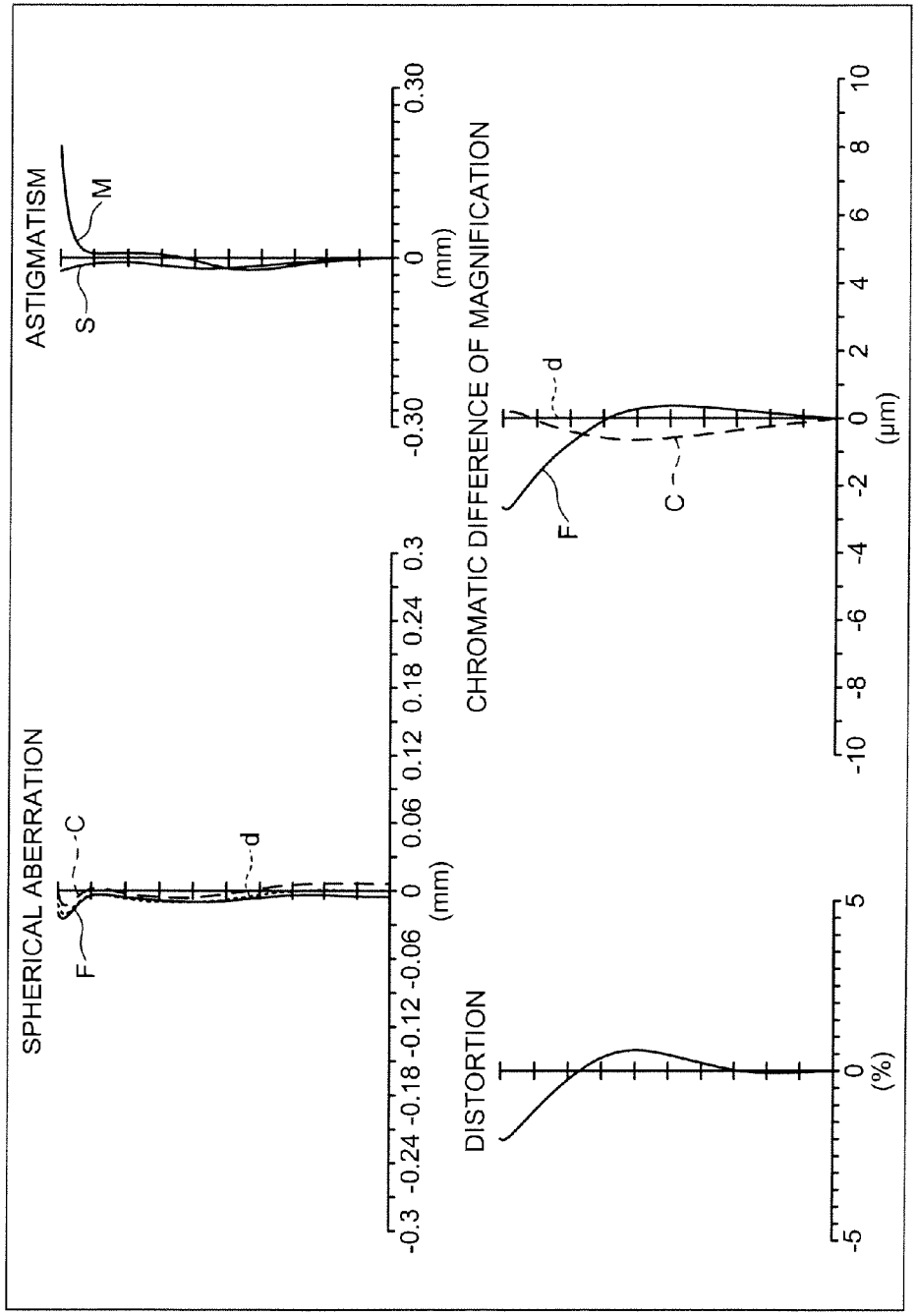
FIG. 12 is a diagram of spherical aberration, astigmatism, distortion, and chromatic difference of magnification for the imaging lens according to the sixth example.

FIG. 12 is a diagram of spherical aberration, astigmatism, distortion, and chromatic difference of magnification for the imaging lens according to the sixth example. FIG. 12 depicts wavelength aberration occurring at F-line (F) (λ=486 nm), d-line (d) (λ=588 nm), and C-line (c) (λ=656 nm). Reference symbols S and T used with respect to astigmatism indicate aberration in the sagittal direction and in the tangential direction, respectively.

Among the values for the examples above, $r_1$, $r_2$, . . . represent radii of curvature for each lens, etc.; $d_1$, $d_2$, . . . represent the thickness of the lenses or the distance between surfaces thereof; $nd_1$, $nd_2$, . . . represent the refraction index of each lens with respect to the d-line (λ=588 nm); $vd_1$, $vd_2$, . . . indicate the Abbe number with respect to the d-line of each lens.

Each of the aspheric surfaces above can be expressed by the following equation, where Z is the depth of the aspheric surface and y is the height from the optical axis, when the direction in which light travels is regarded as positive.

$$Z = \frac{y^2}{R(1+\sqrt{1-(1+K)y/R^2})^2} + Ay^4 + By^6 + Cy^8 + Dy^{10} + Ey^{12} + Fy^{14} + Gy^{16} \quad [1]$$

R is paraxial radius of curvature; K is a constant of the cone; and A, B, C, D and E are the fourth, sixth, eighth, tenth, twelfth, fourteenth, and sixteenth aspheric coefficients, respectively.

As described, the configuration shown in each of the examples enables implementation of an imaging lens that achieves brightness on the order of F number 1.8 to 2 and has excellent optical performance. In particular, the adoption of the third lens having a convex surface on the image side enables implementation of a bright lens. Furthermore, by disposing the first lens and the second lens to have an interval therebetween, correcting surfaces increase and a bright lens is implemented, whereby prominent spherical aberration can be favorably corrected. Since the imaging lenses of the examples include low cost, easy-to-process resin lenses, reductions in manufacturing cost can be facilitated in addition to a reduction in the weight of the optical system.

Further, by equipping the imaging lens of each of the examples, a camera module and imaging apparatus capable of capturing images in dimly lit places, without the use of a flash, can be provided.

The configuration described in an exemplary embodiment not only enables implementation of a compact size and large diameter, but further enables favorable correction of the spherical aberration resulting from the large diameter.

The configuration described in an exemplary embodiment in which the third lens is a biconvex lens enables implementation of a brighter lens and extremely favorable spherical aberration correction.

The configuration described in an exemplary embodiment in which the first lens and the second lens are meniscus lenses having a convex surface on the object side enables favorable correction of various types of aberration such as spherical aberration, coma aberration, etc.

The configuration described in an exemplary embodiment in which the first lens and the second lens are meniscus lenses having a convex surface on the object side enables favorable correction of various types of aberration such as spherical aberration, coma aberration, etc.

The configuration described in an exemplary embodiment in which an aperture stop is disposed between any among the first lens to the fifth lens enables well-balanced correction of chromatic difference of magnification, off-axis aberration, and longitudinal chromatic aberration.

The configuration described in an exemplary embodiment in which an aperture stop is disposed between the second lens and the third lens enables extremely well-balanced correction of chromatic difference of magnification, off-axis aberration, and longitudinal aberration.

The configuration described in an exemplary embodiment in which $3.0 \geqq f/D \geqq 0.7$ is satisfied, D representing an effective diameter of the first lens and f representing a focal length of the imaging lens overall enables provision of a large-diameter imaging lens capable of, within a range of correctable spherical aberration, capturing bright images even in dimly lit places, without the use of a flash.

The configuration described in an exemplary embodiment in which $\upsilon d1>50$ and $\upsilon d2<25$ are satisfied, $\upsilon d1$ representing the Abbe number for the first lens and $\upsilon d2$ representing the Abbe number for the second lens enables extremely favorable correction of chromatic aberration.

The configuration described in an exemplary embodiment enables provision of a camera module capable of capturing images even in dimly lit places, without the use of a flash.

The configuration described in an exemplary embodiment enables provision of a compact imaging apparatus capable of capturing images even in dimly lit places, without the use of a flash.

The present invention achieves brightness on the order of F number 1.8 to 2 and enables provision of a compact imaging lens capable of favorably correcting various types of aberration and having excellent optical performance. Further, by equipping the imaging lens, a camera module and imaging apparatus capable of capturing images even in dimly lit places, without the use of a flash, can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2010-001507 filed in Japan on Jan. 6, 2010.

What is claimed is:

1. An imaging lens sequentially comprising from an object side:
   a positive first lens;
   a negative second lens;
   a positive third lens having a convex surface on an image plane side;
   a fourth lens that is a meniscus lens having a convex surface on the image plane side; and
   a fifth lens having a refractive power that gradually changes from negative at a lens center to positive at a lens periphery,
   wherein the first lens and the second lens are disposed having an interval therebetween, and
   wherein the first lens and the second lens are meniscus lenses having a convex surface on the object side.

2. A camera module comprising:
   the imaging lens according to claim 1, and
   an imaging device that outputs an imaging signal according to an optical image formed by the imaging lens.

3. An imaging apparatus comprising the camera module according to claim 2.

4. An imaging lens sequentially comprising from an object side:
   a positive first lens;
   a negative second lens;
   a positive third lens having a convex surface on an image plane side;
   a fourth lens that is a meniscus lens having a convex surface on the image plane side;
   a fifth lens having a refractive power that gradually changes from negative at a lens center to positive at a lens periphery; and
   an aperture stop disposed between the second lens and the third lens,
   wherein the first lens and the second lens are disposed having an interval therebetween.

5. A camera module comprising:
   the imaging lens according to claim 4, and
   an imaging device that outputs an imaging signal according to an optical image formed by the imaging lens.

6. An imaging apparatus comprising the camera module according to claim 5.

7. An imaging lens sequentially comprising from an object side:
   a positive first lens;
   a negative second lens;
   a positive third lens having a convex surface on an image plane side;
   a fourth lens that is a meniscus lens having a convex surface on the image plane side and
   a fifth lens having a refractive power that gradually changes from negative at a lens center to positive at a lens periphery,
   wherein the first lens and the second lens are disposed having an interval therebetween, and
   wherein $3.0 \geqq f/D \geqq 0.7$ is satisfied, D representing an effective diameter of the first lens and f representing a focal length of the imaging lens overall.

8. A camera module comprising:
   the imaging lens according to claim 7, and
   an imaging device that outputs an imaging signal according to an optical image formed by the imaging lens.

9. An imaging apparatus comprising the camera module according to claim 8.

* * * * *